July 22, 1924.
C. GIRL ET AL
BUMPER
Filed Sept. 28, 1921
1,502,305
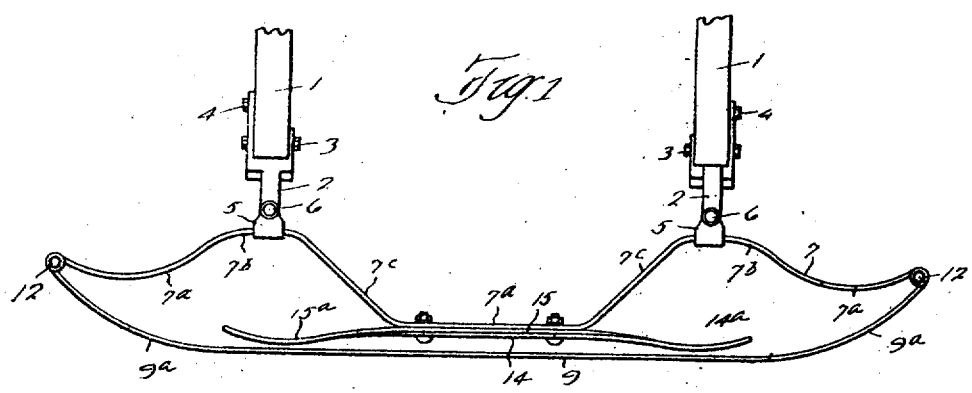
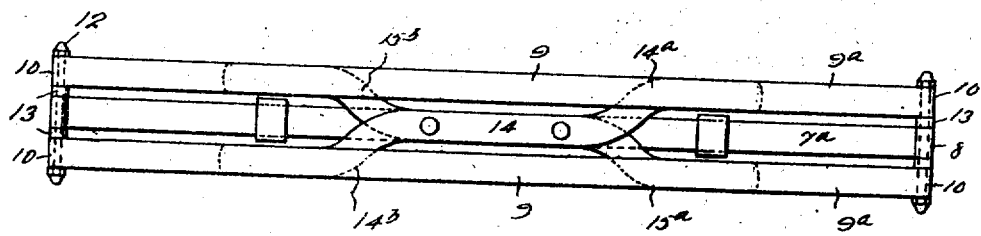
Inventors Patented July 22, 1924.

1,502,305

UNITED STATES PATENT OFFICE.

CHRISTIAN GIRL, OF KALAMAZOO, AND JOHN G. UTZ, OF DETROIT, MICHIGAN, ASSIGNORS, BY DIRECT AND MESNE ASSIGNMENTS, TO THE C. G. SPRING & BUMPER COMPANY, OF DETROIT, MICHIGAN, A CORPORATION OF DELAWARE.

BUMPER.

Application filed September 28, 1921. Serial No. 503,941.

*To all whom it may concern:*

Be it known that we, CHRISTIAN GIRL and JOHN G. UTZ, citizens of the United States, residing at (1) Kalamazoo, in the county of Kalamazoo and State of Michigan, and (2) Detroit, in the county of Wayne and State of Michigan, have invented a certain new and useful Improvement in Bumpers, of which the following is a full, clear, and exact description, reference being had to the accompanying drawings.

This invention relates to bumpers for automobiles and similar vehicles and has for its general object to provide a bumper of this character which is capable of offering a progressive resistance to the transmission of shocks to the vehicle by which it is carried, whereby the bumper is capable of absorbing shocks of varying intensity; also, to provide a bumper of this character which will absorb shocks in this manner, regardless of the particular part of the front impact portion thereof to which the shocks or blows are applied. A further and more limited object of the invention is to provide an efficient means for transmitting shocks in the manner above described from two or more vertically spaced bumper members to and including a rear member. Further and more limited objects of the invention will appear hereinafter and will be realized in and through the construction and combinations of parts illustrated in the drawings and set forth in the claims forming part hereof.

In the drawings, Fig. 1 represents a plan view of our bumper, showing the same attached to the ends of the side members of an automobile; Fig. 2 a front elevation of the said bumper; and Fig. 3 an elevation of one of the intermediate and auxiliary spring plates forming a part of said bumper.

Describing the various parts by reference characters, 1 denotes the ends of the side members of an automobile to which bracket arms 2 are attached in any convenient manner, as by bolts 3 and 4. Pivoted to the ends of the bracket arms 2 are clamping members 5, the pivotal or hinged connections between the said members and arms being indicated at 6. For convenience of description and discussion, the bumper is assumed to be attached to the front ends of the side sills or members of the automobile, and the terms "front" and "rear" will be used in connection with the various parts of the bumper but without limiting our invention to bumpers employed only with the front ends of such vehicles and side members.

Adjustably connected to the clamping members 5 is the rear section of our bumper. This rear section is shown herein as a continuous spring plate member 7 provided at each end with an eye 8 for the reception of the bolts which support the outer ends of the front spring members. The spring plate 7 is preferably bent forwardly from each eye 8, as indicated at 7ª, and then rearwardly, as indicated at 7ᵇ, the clamps 5 being connected to such rearwardly extending portions. The plate is then bent forwardly as shown at 7ᶜ, the last mentioned portions being connected with the central portion 7ᵇ which is substantially parallel with and spaced from the impact section of the bumper comprising two members which will now be described.

Each of the front or impact section members comprises a continuous spring plate 9, each having its outer end rearwardly curved, as shown at 9ª, the outer end of each of said plates being provided with an eye 10, the eyes being adapted to receive the bolts 12 which extend through the eyes 8 on the ends of the plate 7. The plates 9 are spaced apart vertically a distance somewhat greater than the width of the plate 7, the latter plate being located at the rear and intermediate of the plates 9, there being spacers 13 between the eye 8 at each end of the plate 7 and the eyes 10 on the front plates adjacent thereto.

As previously stated, the central portion 7ᵈ of the plate 7 is spaced rearwardly from the corresponding portion of the plate 9. Secured to such central portion 7ᵈ is an impact-transmitting member, said member comprising two spring plates each having a central horizontal portion 14 and 15 respectively adapted to conform to and be secured to the central horizontal portion 7ᵈ of the plate 7 and each having end portions 14ª, 14ᵇ and 15ª, 15ᵇ, respectively, the end portions of each of the last mentioned plates being offset in opposite directions vertically and the end portions of each plate being offset oppositely from the end portions of the other, whereby such end portions are adapted to engage the plates 9 when the latter shall have been deflected rearwardly a sufficient distance by impact. By reference to Fig. 1, it will be observed that the auxiliary plates 14 and 15 are secured to the central portion 7ᵈ of the plate 7, the plate 14 being shown in front of the plate 15. However, the end portions of the plates are so shaped and curved that they are adapted to engage both plates 9 simultaneously on equal deflection or bending of the latter.

Through the construction and arrangement described, light impacts will be absorbed by either or both of the members 9. Heavier impacts will cause either or both of said members to engage the yielding ends of their respective auxiliary plates or members 14 and 15; and the forwardly bowed portion of the rear member 7 will cooperate progressively with the members 9, 14 and 15 in absorbing such impacts in accordance with their severity. A blow of sufficient strength received by either end portion of the bumper will not only cause it to encounter the plates or members 14, 15, but, through the action of the hinges 12 and the supports 2 and 5, will cause the rear member 7 to press said plates or members forward, thus not only insuring the progressive absorption of such blows by the members 7 and 14 or 15, but hastening the engagement of said members. The bumper will thus operate to offer a progressive resistance to the transmission of blows or shocks to the vehicle irrespective of which portion of the impact section may receive the blows or shocks.

Having thus described my invention, what I claim is:

1. In a bumper, the combination of an impact section comprising a plurality of spaced yieldable members, a rear yieldable member connected at its ends to and between the outer ends of the first mentioned members and having its central portion spaced rearwardly from the central portion of such members, and yieldable means carried by the central portion of the said rear member and positioned to engage the corresponding portions of the impact members as the latter are deflected rearwardly.

2. In a bumper, the combination of an impact section comprising a plurality of spaced yieldable members and a rear yieldable member having a portion spaced rearwardly from such members, and yieldable means carried by such portion of the said rear member and positioned to engage the corresponding portions of the front members as the latter are deflected rearwardly.

3. In a bumper, the combination of a pair of vertically spaced yieldable impact members and a rear member connected at opposite ends to the first mentioned members and having its central portion spaced therefrom, and a pair of yieldable plates connected to the central portion of the rear member, said plates having ends positioned to engage either or both of the front members as the latter are deflected rearwardly.

4. In a bumper, the combination of a pair of vertically spaced yieldable impact members and a rear member connected at opposite ends to the first-mentioned members and having its central portion spaced therefrom, and a pair of yieldable plates connected to the central portion of the rear member and each having ends positioned to engage both of the front members as the latter are deflected rearwardly.

5. In a bumper, the combination of an impact section comprising a pair of vertically spaced yieldable members and a rear member connected at its ends to and between the first mentioned members and having its central portion projected forwardly and spaced from the corresponding portions of the first two members, and yieldable members carried by the central portion of said rear member and arranged to be deflected rearwardly by the rearward deflections of either or both of the first mentioned members.

6. In a bumper, the combination of an impact section comprising a pair of vertically spaced yieldable members and a rear member operatively connected to the first mentioned members and having its central portion projected forwardly and spaced from the corresponding portions of the first two members, and yieldable members carried by the central portion of said rear member and positioned to be deflected together with the latter, by the rearward deflections of either or both of the front members.

7. In a bumper, the combination of an impact section comprising a pair of vertically spaced spring plates, a rear section comprising a spring plate connected at its opposite ends to the ends of the first mentioned plates and having its central portion projected toward but spaced from the central portions of the first two plates, and spring arms secured to and projecting from the central portion of the rear plate and positioned to engage the first mentioned plates as the latter are deflected rearwardly.

8. In a bumper, the combination of an impact section comprising a pair of vertically spaced spring plates, a rear section comprising a spring plate operatively connected to the first mentioned plates and having its central portion projected toward but spaced from the central portions of the first two plates, and spring arms secured to and projecting from the central portion of the rear plate and positioned to engage the first mentioned plates as the latter are deflected rearwardly.

9. In a bumper, the combination of an impact section comprising a pair of vertically spaced yieldable members adapted to extend across a vehicle and a single section connected at its opposite ends to the ends of the impact section and having its central portion projecting toward the corresponding portion of the impact section and spaced therefrom, and a pair of spring members secured to the central portion of the second section and each having its ends offset in opposite directions vertically whereby they may engage the members of the impact section, the ends of the said two spring members also being offset in opposite directions vertically.

10. In a bumper, the combination of an impact section comprising a pair of vertically spaced yieldable plates adapted to extend across a vehicle and a single section comprising a yieldable plate connected at its opposite ends to the ends of the impact section and having its central portion projecting toward the corresponding portion of the impact section and spaced therefrom, and a pair of spring plates secured to the central portion of the second section and each having its ends offset in opposite directions vertically whereby they may engage the plates of the impact section, the ends of the said two plates also being offset in opposite directions vertically.

11. In a bumper, the combination of an impact section comprising a plurality of spaced yieldable members, a rear yieldable member connected at its ends to the outer ends of the first mentioned members and having its central portion spaced rearwardly from the central portion of such members, and yieldable means carried by the central portion of the said rear member and positioned to engage the corresponding portions of the impact members as the latter are deflected rearwardly.

12. In a bumper, the combination of an impact section comprising a plurality of spaced yieldable members and a rear yieldable member having a portion spaced rearwardly from such members, yieldable means carried by such portion of the said rear member and positioned to engage the corresponding portions of the front members as the latter are deflected rearwardly, and supporting members pivotally connected to the said rear section.

13. In a bumper, the combination of a pair of vertically spaced yieldable front impact members and a rear member connected at opposite ends to the first mentioned members and having its central portion spaced therefrom, and a pair of yieldable plates connected to the central portion of the rear member, said plates having ends positioned to engage the front members as the latter are deflected rearwardly.

14. In a bumper, the combination of an impact section comprising a pair of vertically spaced yieldable members and a rear member connected at its ends to and between the first mentioned members and having its central portion projected forwardly and spaced from the corresponding portions of the first two members, and yieldable members carried by the central portion of said rear member and positioned to be deflected rearwardly by the rearward deflections of the first mentioned members.

15. In a bumper, the combination of a front impact section comprising a pair of vertically spaced spring plates, a rear section comprising a spring plate connected at its opposite ends to the ends of the first mentioned plates and having its central portion projected toward but spaced from the central portions of the first two plates, spring arms secured to and projecting from the central portion of the rear plate and positioned to engage the first mentioned plates as the latter are deflected rearwardly, and supporting members pivotally connected to the said rear section.

16. In a bumper, the combination of a front impact section comprising a pair of vertically spaced spring plates, a rear section comprising a spring plate operatively connected to the first mentioned plates, spring arms secured to and projecting from the central portion of the rear member and positioned to engage the first mentioned members as the latter are deflected rearwardly, and supporting members pivotally connected to the said rear section.

17. In a bumper, the combination of an impact section comprising a pair of vertically spaced yieldable bars and a secondary section comprising a rear yieldable bar connected at its ends to the first mentioned bars and having its central portion spaced rearwardly from the central portion of the first mentioned bars, and an impact-trasmitting member secured at its central portion to the central portion of the said rear bar and having its ends projecting toward the first mentioned bars, between the central portions and the ends thereof, and arranged to be deflected, by the deflections of the first mentioned bars, toward the rear bar.

18. In a bumper, the combination of a pair of vertically spaced impact bars, a secondary bar having its ends connected to the ends of the first mentioned bars and having its central portion spaced rearwardly from the central portions of the first mentioned bars, and an impact-receiving member having its central portion secured to the central portion of the rear bar and having its ends projecting toward the first mentioned bars, between the central portions and the ends of such bars, and arranged to be deflected rearwardly by the rearward deflections of such first mentioned bars.

In testimony whereof, we hereunto affix our signatures.

CHRISTIAN GIRL.
JOHN G. UTZ.